United States Patent
Priotti

(10) Patent No.: US 9,648,501 B2
(45) Date of Patent: May 9, 2017

(54) INTER-OPERATOR SPECTRUM SHARING CONTROL, INTER-OPERATOR INTERFERENCE COORDINATION METHOD, AND RADIO RESOURCE SCHEDULING IN WIRELESS COMMUNICATION SYSTEMS

(75) Inventor: Paolo Priotti, Tokyo (JP)

(73) Assignee: TELECOM ITALIA S.p.A., Milan (IT)

( * ) Notice: Subject to any disclaimer, the term of this patent is extended or adjusted under 35 U.S.C. 154(b) by 13 days.

(21) Appl. No.: 14/342,698

(22) PCT Filed: Sep. 8, 2011

(86) PCT No.: PCT/EP2011/004525
§ 371 (c)(1),
(2), (4) Date: Mar. 4, 2014

(87) PCT Pub. No.: WO2013/034168
PCT Pub. Date: Mar. 14, 2013

(65) Prior Publication Data
US 2014/0206377 A1    Jul. 24, 2014

(51) Int. Cl.
*H04W 72/00* (2009.01)
*H04W 16/14* (2009.01)
(Continued)

(52) U.S. Cl.
CPC .......... *H04W 16/14* (2013.01); *H04L 5/0032* (2013.01); *H04W 72/0493* (2013.01);
(Continued)

(58) Field of Classification Search
CPC ... H04W 16/14; H04W 24/02; H04W 84/045; H04W 84/12; H04W 88/08; H04W 16/10;
(Continued)

(56) References Cited

U.S. PATENT DOCUMENTS

| 8,032,653 B1* | 10/2011 | Liu | H04L 47/10 370/235.1 |
|---|---|---|---|
| 2008/0101300 A1* | 5/2008 | Oh | H04W 36/0011 370/332 |
| 2009/0059856 A1* | 3/2009 | Kermoal | H04W 16/14 370/329 |
| 2010/0135241 A1* | 6/2010 | Wang | 370/329 |
| 2011/0002274 A1* | 1/2011 | Grandblaise | H04W 16/14 370/329 |

(Continued)

FOREIGN PATENT DOCUMENTS

| EP | 1 494 490 | 1/2005 |
|---|---|---|
| EP | 2 180 737 | 4/2010 |

(Continued)

OTHER PUBLICATIONS

International Search Report Issued Aug. 7, 2012 in PCT/EP11/004525 Filed Sep. 8, 2011.

*Primary Examiner* — Olumide T Ajibade Akonai
(74) *Attorney, Agent, or Firm* — Oblon, McClelland, Maier & Neustadt, L.L.P.

(57) ABSTRACT

An inter-operator radio resource sharing method for sharing radio resources between two or more radio communication systems each controlled by a respective operator and configured to control respective proprietary radio resources and to provide respective served user equipments with radio communication services. The inter-operator radio resource sharing method: determines, by each radio communication system, a bandwidth of respective shared radio resources belonging to the respective proprietary radio resources based on a traffic load related to guaranteed-quality radio communication services requested by the respective served user equipments; signals, by each radio communication system, the respective shared radio resources to other radio communication systems; and provides, by each radio communication system, the respective served user equipments with the radio communication services on the respective proprietary radio resources and on the shared radio resources signalled by other radio communication systems.

20 Claims, 2 Drawing Sheets

(51) Int. Cl.
*H04W 72/04* (2009.01)
*H04L 5/00* (2006.01)
*H04W 72/12* (2009.01)

(52) U.S. Cl.
CPC .... *H04W 72/1252* (2013.01); *H04W 72/0453* (2013.01); *H04W 72/1231* (2013.01)

(58) Field of Classification Search
CPC ..... H04W 72/04; H04W 28/26; H04W 72/00; H04W 72/0453; H04W 48/16; H04W 72/042; H04W 72/0493; H04W 72/12; H04W 72/1215; H04L 12/5695; H04L 47/22; H04L 65/80; H04L 5/0032
USPC .... 455/446, 447, 448, 449, 450, 451, 452.1, 455/452.2, 453, 454, 509; 370/328–330
See application file for complete search history.

(56) References Cited

U.S. PATENT DOCUMENTS

2011/0009145 A1* 1/2011 Pirinen ................ H04W 16/14
455/509
2011/0158184 A1* 6/2011 Agulnik ................ H04W 28/18
370/329

FOREIGN PATENT DOCUMENTS

| FR | 1494490 A1 | * | 1/2005 | ............ H04W 16/14 |
|----|----|----|----|----|
| IT | 0900480 | * | 10/2009 | ............ H04W 16/10 |
| IT | PCT/IT2009/000480 | * | 5/2011 | ............ H04W 72/08 |
| WO | WO 2005 004516 A1 | * | 1/2005 | ............ H04W 16/14 |
| WO | 2009 103841 | | 8/2009 | |

* cited by examiner

INTER-OPERATOR SPECTRUM SHARING CONTROL, INTER-OPERATOR INTERFERENCE COORDINATION METHOD, AND RADIO RESOURCE SCHEDULING IN WIRELESS COMMUNICATION SYSTEMS

TECHNICAL FIELD OF THE INVENTION

The present invention relates in general to wireless communication systems, and more specifically to inter-operator spectrum sharing control, inter-operator interference coordination, and radio resource scheduling in radio communication systems partially sharing their respective proprietary frequency spectrum.

In particular, the present invention may find advantageous, but not limitative, application in different categories of wireless communication systems, including cellular and non-cellular radio communication systems.

In detail, cellular radio communication systems where the present invention may find advantageous, but not limitative, application are, for example, the so-called beyond-3G (3rd Generation) cellular networks with spectrum sharing applied between different networks.

Moreover, the present invention can be also advantageously exploited in non-cellular wireless networks, such as networks based on Worldwide Interoperability for Microwave Access (WiMAX) technology, with spectrum sharing applied between different networks.

In the following, for the sake of description simplicity and without losing generality, specific reference will be made to Third Generation Partnership Project (3GPP) Long Term Evolution (LTE) cellular radio communication systems, remaining it clear that the present invention can be applied also to other cellular and non-cellular radio communication systems. For this reason, when referring to a base station being part of a network infrastructure, the terminology "evolved-Node B" (e-Node B), that is the terminology commonly adopted in 3GPP LTE cellular radio communication systems, will be used.

Furthermore, in the following and in the attached drawings, for the sake of simplicity, the terms "operator(s)" and "user(s)" will be used under an assumption that they implicitly intend, i.e., mean, respectively, the radio communication system(s) owned, controlled and managed by the operator(s), and the user equipment(s) used by the user(s).

BACKGROUND ART

In general, cellular radio communication systems based on Orthogonal Frequency Division Multiplexing (OFDM) transmission, and with unitary or quasi-unitary frequency reuse factor, suffer from inter-cell interference. In particular, all 3GPP standards starting from Long Term Evolution (LTE, part of Release 8), and including LTE-Advanced (LTE-A, part of Release 10) and beyond, suffer in general from inter-cell interference, because they are based on OFDM for downlink (DL) transmission, and on Single-Carrier Frequency Division Multiple Access (SC-FDMA) for uplink (UL) transmission.

As is known, different methods for characterizing co-channel interference in radio communication systems have been presented in the past. In this connection, specific reference is made to Applicant's international patent applications WO 2008/095543 and WO 2008/096383.

Moreover, also different methods for coordinating intra-system interference in radio communication systems have been presented in the past. In this connection, specific reference is made to Applicant's international patent applications WO 2011/051981 and WO 2011/051980.

In detail, said Applicant's international patent applications teach how to characterize inter-cell interference and how to implement Inter-Cell Interference Coordination (ICIC) so as to mitigate interference between neighbouring cells. Additionally, said Applicant's international patent applications teach to exploit communications on X2 interface between e-Node Bs in order to coordinate scheduling in neighbouring cells taking into account inter-cell interference. The timing that characterizes the evolution of the coordination process can be relatively slow (e.g. one coordination cycle every several tens to hundreds of ms). Interference characterization can be achieved with the same measurements that User Equipments (UEs) already perform to assist handover and other common procedures for cellular networks.

Furthermore, as is known, an inter-operator spectrum sharing scenario exists when a plurality of operators, each owning and controlling a respective proprietary frequency spectrum, partially share their respective proprietary frequency spectrum.

In this connection, United States Patent Application US 2009/0191889 A1 discloses a method of controlling spectrum use in a first wireless communication system which is operable to take part in a spectrum assignment process involving a plurality of wireless communication systems including the first wireless communication system, in which spectrum assignment process one of the said wireless communication systems assigns a portion of spectrum to at least one of the other said wireless communication systems.

In particular, the method according to US 2009/0191889 A1 comprises effecting an instance of the spectrum assignment process in response to a trigger which is based on network conditions.

In detail, the method according to US 2009/0191889 A1 comprises calculating a traffic delivery success ratio for the first wireless communication system and effecting the instance of spectrum assignment process in response to the traffic delivery success ratio being under a predetermined threshold.

Specifically, according to US 2009/0191889 A1, calculating a traffic delivery success ratio comprises determining a ratio of the quantity of traffic delivered to/from the first wireless communication system to the quantity of traffic which was intended for delivery to/from the first wireless communication system.

OBJECT AND SUMMARY OF THE INVENTION

FIG. 1 schematically shows a scenario wherein two operators share a respective portion of their proprietary spectrum. In particular, FIG. 1 shows a "cooperative and prioritized" inter-operator spectrum sharing scenario at a generic time instant t=t* of a dynamically evolving spectrum sharing situation.

Although in the following, for the sake of description simplicity, explicit reference will be made to this single type of inter-operator spectrum sharing scenario, it remains clear that the present invention can be equally applied to cooperative inter-operator spectrum sharing scenarios where no priorities among operators exist.

In the cooperative and prioritized inter-operator spectrum sharing scenario shown in FIG. 1 a first operator "A" has a license for selling services on a first proprietary frequency channel "a", and a second operator "B" has a license for selling services on a second proprietary frequency channel "b".

Moreover, as shown in FIG. 1, the operators A and B have the possibility to share at least a portion of their respective proprietary channel. In particular, the first operator A (for example according to peer-to-peer agreements between the operators A and B) offers to dynamically allocate a portion "α''''" of the first channel a which can be used also by the second operator B inside a given transmission standard, while the remaining unshared portion of the first channel a, which in FIG. 1 and in the following is denoted by "α'", is for exclusive use by the first operator A. Moreover, at the same time, the second operator B offers to dynamically allocate a portion "β''''" of the second channel b which can be used also by the first operator A inside said given transmission standard, while the remaining unshared portion of the second channel b, which in FIG. 1 and in the following is denoted by is for exclusive use by the second operator B. Anyway, the first operator A maintains the full control on the first channel a (a feature that in the following will be addressed as paternity of the first channel a), and the second operator B maintains the full control on the second channel b (a feature that in the following will be addressed as paternity of the second channel b).

In other words, at the generic time instant t=t*, the first operator A shares with the second operator B the subband α'' whose bandwidth is decided autonomously by the first operator A, and the second operator B shares with the first operator A the subband β'' (disjoint from α'') whose bandwidth is decided autonomously by the second operator B.

Moreover, in the cooperative and prioritized inter-operator spectrum sharing scenario shown in FIG. 1 users from the first operator A can use both α'' and β'', but have priority over users from the second operator B when using α''. Vice versa, users from the second operator B have priority when accessing β''. This lets the operators A and B provide users with a better Quality of Service (QoS) not only on the spectrum for exclusive access, but also on the shared band. A prioritized access can be set up via proper biasing of schedulers of the operators A and B. In this scenario an assumption is made that pre-set priorities are invariable in time or slowly variable, and both the operators A and B have knowledge of their values. Pre-set priorities are important especially when the network is not fully loaded and there are instantaneous traffic bursts.

The Applicant has noted that different issues affect an inter-operator spectrum sharing scenario.

In particular, with reference to the inter-operator spectrum sharing scenario shown in FIG. 1, the Applicant has noted that there is a need:

to synchronize in time the knowledge of operators A and B about the bandwidth and location in the frequency spectrum of α'' and β''; and to manage ICIC between the operators A and B for the portion of spectrum made up of α'' and β''.

Moreover, the Applicant has further noted that, in case scheduling priorities change in time, there is also a need to exchange between the operators A and B values of said scheduling priorities.

Therefore, the objective of the present invention is to provide a methodology which can solve at least some of the above cited issues.

This objective is achieved by the present invention in that it relates to an inter-operator radio resource sharing method, an inter-operator interference coordination method, a radio resource scheduling method, a radio communication system and a network apparatus configured to carry out said inter-operator radio resource sharing method, a radio communication system and a network apparatus configured to carry out said inter-operator interference coordination method, a radio communication system and a network apparatus configured to carry out said radio resource scheduling method, a computer program product comprising software code portions for implementing said inter-operator radio resource sharing method, a computer program product comprising software code portions for implementing said inter-operator interference coordination method, and a computer program product comprising software code portions for implementing said radio resource scheduling method, as defined in the appended claims.

In particular, the present invention achieves the aforementioned objective by an inter-operator radio resource sharing method for sharing radio resources between two or more radio communication systems each controlled by a respective operator and at least one thereof being configured to control respective proprietary radio resources and to provide respective served user equipments with radio communication services.

In detail, the inter-operator radio resource sharing method comprises:

determining, by at least one radio communication system, a bandwidth of respective shared radio resources belonging to the respective proprietary radio resources on the basis of a traffic load related to guaranteed-quality radio communication services requested by the respective served user equipments;

signalling, by said at least one radio communication system, the respective shared radio resources to the other radio communication system(s);

receiving, at said at least one radio communication system, shared radio resources signalled by the other radio communication system(s); and providing, by at least one of said radio communication system, the respective served user equipments with the radio communication services on the respective proprietary radio resources and on the shared radio resources signaled by the other radio communication system(s).

Moreover, the present invention concerns also an inter-operator interference coordination method for implementing a coordination of inter-operator interference experienced in two or more radio communication systems each controlled by a respective operator and configured to control respective proprietary radio resources and to provide respective served user equipments with radio communication services on the respective proprietary radio resources and on radio resources shared by the other radio communication system(s).

In detail, the inter-operator interference coordination method comprises:

carrying out, by the radio communication systems, said inter-operator radio resource sharing method so that each radio communication system is aware of the radio resources shared by the other radio communication system(s); and exchanging between the radio communication systems inter-operator coordination messages concerning inter-operator interference on interfered radio resources.

Additionally, the present invention further concerns a radio resource scheduling method for scheduling radio resources in a given radio communication system comprised in a group of two or more radio communication systems each of which is controlled by a respective operator and is configured to control respective proprietary radio resources and to provide respective served user equipments with radio communication services on the respective proprietary radio resources and on radio resources shared by the other radio communication system(s).

In detail, the radio resource scheduling method comprises:

carrying out, by the radio communication systems, said inter-operator interference coordination method so that each radio communication system is aware of the radio resources shared by the other radio communication system(s) and the radio communication systems exchange inter-operator coordination messages concerning inter-operator interference on interfered radio resources;

computing, by the given radio communication system, scores of potential allocations to the respective served user equipments of the respective proprietary radio resources and of the radio resources shared by the other radio communication system(s) on the basis of the exchanged inter-operator coordination messages concerning inter-operator interference on the respective proprietary radio resources and on the radio resources shared by the other radio communication system(s); and scheduling, by the given radio communication system, a radio resource allocation of the respective proprietary radio resources and of the radio resources shared by the other radio communication system(s) to the respective served user equipments on the basis of the computed scores.

Additionally, the present invention further concerns an inter-operator radio resource sharing method for sharing radio resources between two or more radio communication systems each controlled by a respective operator and configured to control respective proprietary radio resources and to provide respective served user equipments with radio communication services, the inter-operator radio resource sharing method comprising:

determining, by at least one radio communication system, a bandwidth of respective shared radio resources belonging to the respective proprietary radio resources on the basis of a traffic load related to guaranteed-quality radio communication services requested by the respective served user equipments;

signalling, by said at least one radio communication system, the respective shared radio resources to the other radio communication system(s); and providing, by said other radio communication system, the respective served user equipments with the radio communication services on the respective proprietary radio resources and on the shared radio resources signalled by the said at least one radio communication system(s).

BRIEF DESCRIPTION OF THE DRAWINGS

For a better understanding of the present invention, preferred embodiments, which are intended purely by way of example and are not to be construed as limiting, will now be described with reference to the attached drawings, wherein.

DETAILED DESCRIPTION OF PREFERRED EMBODIMENTS OF THE INVENTION

Figure 1:
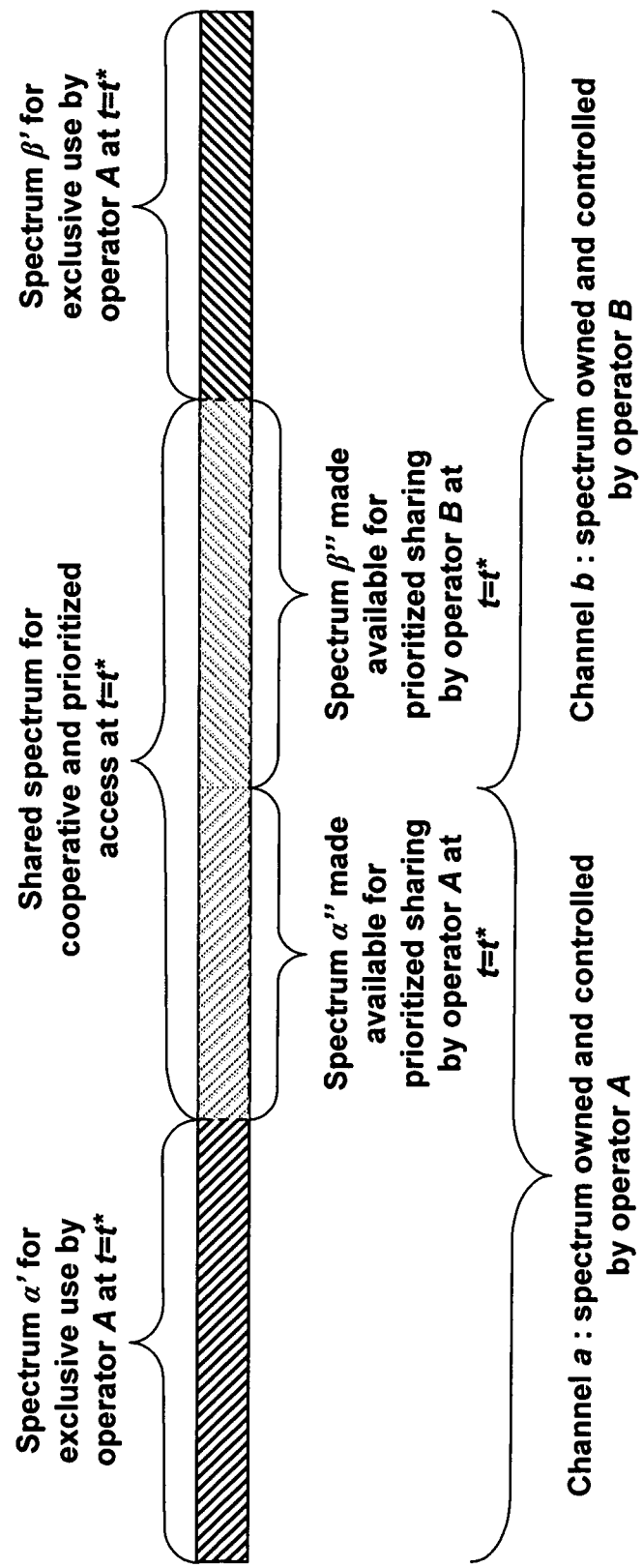
FIG. 1 schematically shows a cooperative and prioritized inter-operator spectrum sharing scenario.

The following discussion is presented to enable a person skilled in the art to make and use the invention. Various modifications to the embodiments will be readily apparent to those skilled in the art, without departing from the scope of the present invention as claimed. Thus, the present invention is not intended to be limited to the embodiments shown, but is to be accorded the widest scope consistent with the principles and features disclosed herein and defined in the appended description and claims.

Moreover, the present invention can be conveniently implemented by means of one or more software program(s) loadable in a memory of a network apparatus, in particular a base station, of a radio communication system, and comprising software code portions for implementing, when the software program is run on the network apparatus, the methods described hereinafter.

The present invention applies to radio communication systems wherein radio interface between base stations, such as e-Node Bs, and mobile stations, such as UEs, is based on a physical layer with multi-carrier transmission, and wherein spectrum sharing is applied between different networks.

In particular, for sake of description simplicity and without losing generality, in the following focus will be on downlink transmission of Frequency Division Duplexing (FDD) networks, remaining it clear that the present invention can be equally applied also to downlink transmission of Time Division Duplexing (TDD) systems and that extensions can be adapted also for uplink transmission.

In detail, in the following, in wireless communication systems under consideration, an assumption is made that a downlink of 3GPP Evolved-UMTS Terrestrial Radio Access Network (E-UTRAN) LTE systems is adopted, remaining clear that the present invention is applicable to other cellular and non-cellular systems based on OFDM or other multi-carrier transmissions.

Moreover, in the following another assumption is made that the 3GPP E-UTRAN LTE systems use a given frequency band wherein each e-Node B can allocate resources to users with a granularity of one Physical Resource Block (PRB) in the frequency domain, i.e., a PRB being the minimum allocation unit for a scheduler of a e-Node B, and one Transmission Time Interval (TTI) in the time domain, one TTI being made up of a number of consecutive OFDM symbols and having a fixed length. However the present invention is also applicable in case of variable-length TTIs. In the 3GPP E-UTRAN LTE systems under consideration it is not possible to allocate one PRB to a certain user for a time shorter than a TTI. However the present invention is applicable also to systems wherein resource allocation has a finer resolution in time dimension.

The present invention comprises several aspects, in particular:

a first aspect concerning a spectrum sharing control with channel paternity scheme, which spectrum sharing control includes signalling over an inter-operator interface that can conveniently be a network interface similar to X2, or can conveniently represent some type of air-interface in-band (for example using a new channel specifically designed for inter-operator communication under the LTE/LTE-A standard) or out-of-band signaling (for example using point-to-point microwave radio links operating outside the band of the LTE/LTE-A system);

a second aspect concerning an inter-operator inter-cell interference characterization based on radio measurements on the air interface;

a third aspect concerning an inter-operator Inter-Cell Interference Coordination (ICIC) adopted between different operators, not only to minimize reciprocal interference, but also to synchronize sharing status between different networks and to preserve Quality of Service (QoS) (while inside a given network ICIC can still be used with the purpose to reduce inter-cell interference); and a fourth aspect concerning radio resource scheduling in an inter-operator spectrum sharing scenario.

In the following an example of radio operation in a multi-operator context according to the present invention will be described.

In particular, for the sake of description simplicity and without losing generality, in the following specific reference will be made to the case of two operators, remaining it clear that the present invention can be also advantageously exploited with any number of operators.

In detail, in the following specific reference will be made to the inter-operator spectrum sharing scenario shown in FIG. 1, which inter-operator spectrum sharing scenario is shown in greater detail in FIG. 2.

Figure 2:
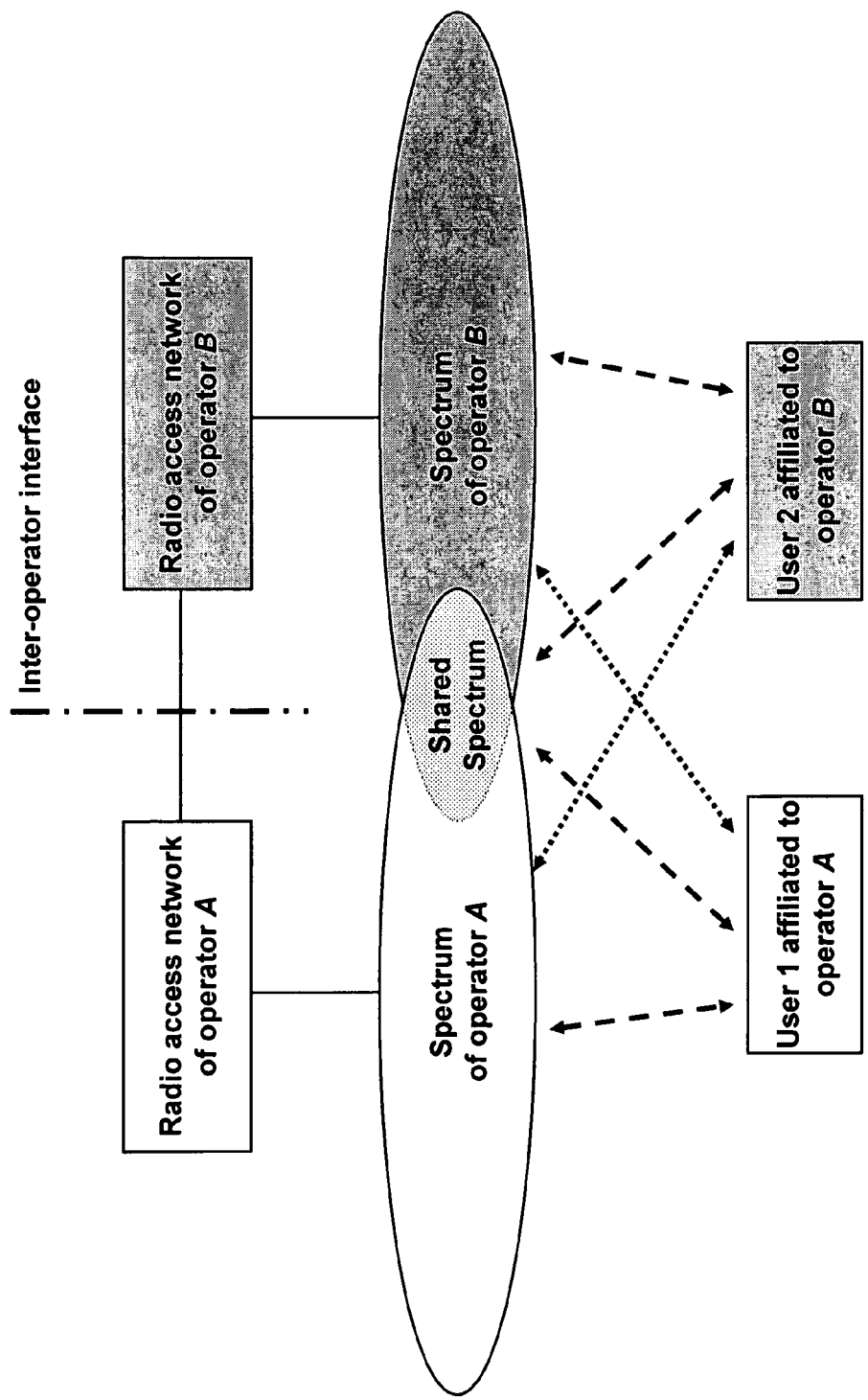
FIG. 2 shows in greater detail the inter-operator spectrum sharing scenario of FIG. 1.

Specifically, FIG. 2 shows:

the two operators A and B (already shown in FIG. 1) that have separate, independent radio access networks and share a portion of their respective proprietary spectrum;

an inter-operator interface (represented by a dot-dash line) that exists between the two operators A and B, specifically a network interface that exists between the two radio access networks, thereby giving the possibility to exchange various types of signalling between the two radio access networks;

a first user 1 affiliated to the first operator A; and a second user 2 affiliated to the second operator B.

According to a preferred embodiment of the present invention, an assumption is made that the inter-operator interface has a limited bandwidth and that the signalling over said interface may imply a certain delay. This makes so that inter-operator ICIC has a cycle time in the order of e.g. tens to hundreds of ms, and does not follow very rapidly evolving phenomena like fast fading. As such, the process may use quantities derived or taken from measurements on the radio interface, but, according to the preferred embodiment of the present invention, those quantities are conveniently averaged over tens to hundreds of ms.

Moreover, in the inter-operator spectrum sharing scenario shown in FIG. 2 it is assumed that a function of inter-operator hand-over may have been implemented to allow the users 1 and 2 to be served by the base stations, specifically by the e-Node Bs, of both the operators A and B when necessary. In particular, in FIG. 2 dashed double-arrows represent radio links active between the users 1 and the operators A and B without inter-operator handover, while dotted double-arrows represent radio links that can exist only after an inter-operator handover procedure has taken place. Conveniently, the inter-operator hand-over procedure may be dependent on various parameters including pre-defined priorities, traffic estimates, commercial agreements, but the detail description of such procedure will be omitted as it is not essential to understand the present invention.

In the following the several aspects of the present invention will be detailed.

Firstly, the spectrum sharing with channel paternity scheme according to the first aspect of the present invention will be described.

In particular, in the following a narrowband distributed spectrum sharing control method with channel paternity scheme will be described in detail with specific reference to the preferred embodiment of the present invention.

Specifically, an assumption is made that at least one operator between the operators A and B has full control of the respective proprietary channel it has available. This means that at least one operator can decide in every instant how much bandwidth it wants to share. These decisions will typically be taken on a slow time basis and signalled periodically or asynchronously to the other operator.

In general, the bandwidth of α" will be decided dynamically by the first operator A based on parameters including average estimated network load. Calling $B_{\alpha"}$ the bandwidth of α", it is possible to define analytically $B_{\alpha"}$ as follows:

$$B_{\alpha"}=f(\overline{\theta}_a^{QoS}),\ 0 \le B_{\alpha"} \le B_a, \quad (1)$$

where $B_a$ is a bandwidth of the full first channel a; in case the first channel a is not continuous in the frequency domain, $B_a$ is the sum of the bandwidths of all the components of the first channel a;

$\overline{\theta}_a^{QoS}$ is an average traffic load for services with guaranteed QoS that is estimated by the first operator A; more precisely, $\overline{\theta}_a^{QoS}$ is the traffic load due to requests for services with guaranteed QoS coming from users affiliated to the first operator A and made towards the first operator A; on the other hand, requests made by those users affiliated to the first operator A but made towards the second operator B (because the inter-operator hand-over procedure has selected a serving e-Node B that belongs to the second operator B) are not included in the count; conversely, requests made by those users affiliated to the second operator B but made towards the first operator A (because the inter-operator hand-over procedure has selected a serving e-Node B that belongs to the first operator A) are included in the count; the reason to include this contribution is that once a user belonging to the second operator B is served by the first operator A, then for the radio interface he/she behaves exactly like a user affiliated to the first operator A (until the call is terminated, or the inter-operator hand-over moves the user back to an e-Node B belonging to the second operator B); a practical way to measure an average traffic load is to sum the length of the queues for a certain time interval and then divide the total for the length of the time interval; and f(•) denotes a monotonically decreasing, or non-increasing, function of its argument; it is made known to and applied by at least one, preferably by both the operators A and B; f(•) may be conveniently dependent on backhauling capacity or other parameters as specified in the following.

After the second operator B has received signalling for $B_{\alpha"}$, within a predefined time duration it should adapt to the value of $B_{\alpha"}$. This means that if $B_{\alpha"}$ has increased since the value given by the previous inter-operator signalling operation, then the second operator B has more shared bandwidth to accommodate transmissions. If, on the other hand, $B_{\alpha"}$ has shrunk, then the second operator B has to reallocate or drop services that might be ongoing in the bandwidth slice that is not shared any longer by the first operator A.

The same rules and definitions just described applies naturally also for the variable bandwidth $B_{\beta"}$ of the subband β" of the second channel b given for sharing by the second operator B. At least one, preferably both the operators A and B will exchange, synchronously or asynchronously, messages through the inter-operator interface to let the other operator know what are the PRBs mapped to α" and β".

Secondly, the inter-operator inter-cell interference characterization according to the second aspect of the present invention will be described.

In particular, in the following a long-term inter-operator inter-cell interference characterization method will be described in detail with specific reference to the preferred embodiment of the present invention.

Specifically, as disclosed in the previously-enclosed-by-reference Applicant's international patent application WO 2008/095543, it is possible to characterize the inter-cell interference situation of a cell based on the standard measurements that UEs make to enable functions like hand-over. According to said second aspect of the present invention the inter-cell interference characterization is brought to the level of enabling the characterization of interference caused by other operators. In detail, an assumption is made that at least one, preferably both the operators A and B transmit a set of reference signals (pilot signals) that are mutually known to the users of the other operator A or B and can be used for interference-related measurements like the ones considered in the following.

In the following measurements that may be performed for intra-operator inter-cell interference characterization will not be described because they can happen exactly as described in the Applicant's international patent application WO 2008/095543, while focus will be only on measurements that happen between cells belonging to different operators.

In detail, according to said second aspect of the present invention, an assumption is made that the first operator A transmits a set of pilot signals that can be received by the users served by the second operator B, which means users affiliated to the second operator B and served by the second operator B, and users affiliated to the first operator A but served, at a considered time instant, by the second operator B because of inter-operator hand-over. The set of pilot signals can cover all the PRBs or a subset thereof. Let us assume that a k-th UE served by the second operator B measures at a time instant n the following interference powers from interfering e-Node Bs of the first operator A:

$$\phi_{nk}^A = \{p_1, \ldots, p_Q\}, \quad (2)$$

where Q is the maximum number of e-Node Bs belonging to the first operator A that are included in the measurements carried out by the k-th UE served by the second operator B. Conveniently, Q will be selected large enough to take into account the main interfering cells (or main interferers) with respect to each cell. According to the preferred embodiment of the present invention, for each i-th interfering e-Node B a single value $p_i$ is memorized, because measurements are intended as wide-band and averaged over a certain time interval. Of course the k-th UE will also measure a set of interference power values from the interfering cells of the second operator B, i.e. $\phi_{nk}^B = \{p_1, \ldots, p_Q\}$, but, since, as previously said, intra-operator interference characterization processes are not herein described, how to use $\phi_{nk}^B$ is not herein explained (for example, it can be conveniently assumed that intra-operator interference characterization is performed according to the teachings of the Applicant's international patent application wo 2008/095543).

Assuming that power $\pi_p$ used by the e-Node Bs of the first operator A to transmit the pilot signals is known to the k-th UE served by the second operator B and affected by interference caused by said interfering e-Node Bs of the first operator A, then said k-th UE is capable to estimate a long-term attenuation existing between said interfering e-Node Bs of the first operator A and itself. In particular, a vector of estimated attenuations in logarithmic units can be written as:

$$\Psi_{nk}^A = \pi_p + \eta - \{p_1, \ldots, p_Q\} == \quad (3)$$

$$\{\pi_p + \eta - p_1, \ldots, \pi_p + \eta - p_Q\} == \{a_{k1}^{(n)}, \ldots, a_{kQ}^{(n)}\},$$

where the term $\eta$ is inserted to take into account a possible transmission power control on pilot power (which usually is made known to the UEs via downlink signalling) or other constants that may be needed to take into account a possible constant offset between the measurement (2) and the value of $\pi_p$.

The k-th UE periodically feeds back the vector of attenuations (3) to its serving e-Node B, while each neighboring e-Node B, at regular intervals and via network interfaces, transmits to said serving e-Node B a vector $P_{mi} = \{\pi_{i1}, \ldots, \pi_{iN}\}$ which represents transmission powers at the time instant n for the N PRBs and wherein i is an index identifying the transmitting neighboring e-Node B. Therefore, the serving e-Node B is capable to estimate an interference power seen by each of its served UEs as an effect of interference caused by the first operator A. In fact, for each time instant n the inter-operator inter-cell interference power seen by the k-th UE on the m-th PRB can be estimated as:

$$\sigma_{km}^A = 10 \log_{10} \sum_{i=1}^{Q} 10^{\frac{\pi_{im} - a_{ki}}{10}} \quad (4)$$

where time-dependency (index n) has been intentionally dropped in all the terms so as to follow the notation used in the Applicant's international patent application WO 2008/095543.

It should be noted that the serving e-Node B can also estimate the total (inter-operator and intra-operator) interference power as follows:

$$\sigma_{km} = \sigma_{km}^A + \sigma_{km}^B \quad (5)$$

where $\sigma_{km}^B$ denotes an estimated intra-operator inter-cell interference power seen by the k-th UE on the m-th PRB, and can be conveniently computed according to the teachings of the Applicant's international patent application WO 2008/095543.

The just described long-term (or slow time scale) inter-operator inter-cell interference characterization terminating with the computation of (4) preferably serves as a basis for the inter-operator ICIC according to the third aspect of the present invention.

In this connection, in the following the inter-operator ICIC will be described in detail with specific reference to the preferred embodiment of the present invention.

Specifically, while ICIC methods described in the previously-enclosed-by-reference Applicant's international patent applications WO 2011/051980 and WO 2011/051981 are applied to intra-operator scenarios, the present invention teaches to apply an ICIC method to inter-operator scenarios as well.

In detail, according to the preferred embodiment of the present invention, it is assumed that messages can be exchanged between the operators A and B through the narrowband inter-operator interface in order to improve transmission performance of the networks of at least one, preferably both the operators A and B. Following and expanding the notation used in the Applicant's international patent application WO 2011/051980, a generic inter-operator coordination message originated from an i-th e-Node B belonging to the second operator B and terminating in a j-th e-Node B belonging to the first operator A is indicated as:

$$K_{ij_{BA}}{}^l = \{m, \phi_m\}, \quad (6)$$

where $\phi_m$ indicates an additional average power, in comparison with currently transmitted average power, which will be transmitted by the i-th e-Node B on the m-th PRB in the next ICIC period. Index l allows to distinguish a plurality of inter-operator coordination messages which might be exchanged between the same e-Node Bs in the same ICIC period. However, during one ICIC period, only a maximum of one inter-operator coordination message per PRB can be transmitted from the i-th e-Node B to the j-th e-Node B.

In general all the inter-operator coordination messages (6) exchanged during an ICIC period should be taken into account altogether starting from the next ICIC period. The inter-operator coordination messages (6) are separate and are not to be confused with messages specifying what PRBs belong to α" and β", as previously described in relation to the spectrum sharing control with channel paternity scheme. However, in a practical implementation both types of messages may be combined in just one family of narrowband messages conveying various information.

The meaning attributed to the inter-operator coordination messages (6) does not preclude that, in a practical, detailed design, messages can be produced according to various strategies, and can be conveniently "push" and/or "pull" types of messages. In this connection, reference can be made to push/pull intra-operator coordination messages which are described in the Applicant's international patent application WO 2011/051980 and which can be conveniently adapted to the inter-operator case.

Activation of inter-operator coordination messages can be defined according to an estimated interference present on the various resources. For example, let us consider a cell served by the i-th e-Node B belonging to the second operator B. If the total number of UEs present in the considered cell is U, it is possible to define as interference load of the m-th PRB due to the first operator A the quantity:

$$\lambda_m^A = \sum_{k=1}^{U} \sigma_{km}^A \cdot \delta_{km}, \quad (7)$$

where $\delta_{km}$ is an activity factor of the k-th UE in the m-th PRB, relative to the last ICIC period. According to the definitions presented in the Applicant's international patent application WO 2011/051980, $\delta_{km}$, is known to the serving e-Node B and is normalized between 0 and 1. In particular, a null value means that the UE does not use the specified PRB.

Therefore, preferably, a necessary but not sufficient condition to originate an inter-operator coordination message (6) is that:

$$\lambda_m > t_h,$$

where $t_h$ is a threshold which depends on the particular radio communication system under consideration.

Furthermore, the scheduling according to the fourth aspect of the present invention will be described.

In particular, in the following a prioritized scheduling method for real-time traffic balance under QoS assumptions will be described in detail with specific reference to the preferred embodiment of the present invention.

Specifically, during the scheduling phase the operator has the capability to take into account various factors, namely:
- the distributed spectrum sharing control to decide what PRBs can be scheduled and what not (this is connected to the slow evolution in time of average traffic load);
- the inter-operator and intra-operator ICIC for interference minimization and optimization of cell-edge users performance; and
- priorities in the access to paternity spectrum to balance rapid traffic variations.

It is assumed that the first operator A has decided $B_{\alpha"}$ (and consequently has decided all the PRBs included in α"), and has communicated it to the second operator B via the narrowband inter-operator interface. Vice versa, the second operator B has decided $B_{\beta"}$ and communicated it to the first operator A. This gives a map of the PRBs that can be considered for allocation by at least one operator. Extending the notation used in the Applicant's international patent application WO 2011/051981 and considering the first operator A, it is possible to define a scheduling score $\Omega_\tau(m, k)$ for an assignment of the m-th PRB to the k-th UE in the τ-th TTI as:

$$\Omega_\tau(m, k) = \beta \cdot f_1[C(m, k)] + -\mu_1 \cdot f_2\left[\sum_{l \in \phi_1} \phi_m(K_{ij}^l)\right] - \quad (8)$$

$$\mu_2 \cdot f_3\left[\sum_{l \in \phi_2} \phi_m(K_{ij_{BA}}^l)\right] + + \rho \cdot f_4(P_m) + \xi \cdot f_5(\theta_a^{QoS}, m),$$

where
- C(m,k) is an estimated transmission capacity associated with the assignment of the m-th PRB to the k-th UE;
- $\Phi_1$ is a set of values of l that identify intra-operator coordination messages for the m-th PRB;
- $\Phi_2$ is a set of values of l that identify inter-operator coordination messages for the m-th PRB;
- $P_m$ is a power level transmitted on the m-th PRB;
- $f_1$, $f_2$ and $f_3$ are optional, generic, monotonic, nonlinear functions;
- $f_4$ is a function used to weigh $P_m$ and having a maximum for a target power level, while it decreases as actual power level becomes different from the target power level;
- $\theta_a^{QoS}$ is an instantaneous traffic load for services with guaranteed QoS that is measured by the first operator A;
- for m inside paternity spectrum areas of the first operator A, $f_5$ is an increasing function of the instantaneous traffic load $\theta_a^{QoS}$ used to bring pre-set priorities into action; $f_5$ is instead null outside paternity spectrum areas of the first operator A;
- β, $\mu_1$, $\mu_2$ and ρ are positive coefficients that can be modified for network tuning in a first phase, and later can be readjusted by system operation & maintenance (O&M) to optimize network throughput depending on traffic conditions, propagation scenario (e.g. microcell or macrocell), QoS, etc.; and
- ξ is a positive constant that tunes pre-set priorities over paternity spectrum of the first operator A.

In general, C(m,k) depends on the Signal-to-Noise-plus-Interference Ratio (SNIR) that the k-th UE measures on the m-th PRB, and can be derived from the Channel Quality Indicator (CQI) of the m-th PRB computed by the k-th UE.

Normally, scheduling policy is vendor-specific and may depend on a substantial number of parameters and design choices. What is taught by the present invention is that the overall allocation takes into account the scheduling score (8). This could happen, for example, producing several candidate allocations and choosing the one that maximizes the sum of the scores. For optimization of the ICIC process, transmission power per PRB is kept relatively constant over an ICIC cycle by means of $f_4$. $f_5$ and $\xi$ are instead chosen so that, when $\theta_a^{QoS}$ reaches a certain threshold, the score becomes very heavily influenced by the term $\xi \cdot f_5(\theta_a^{QoS}, m)$.

An exemplary definition of $f_5$ for the first operator A can be conveniently as follows:

$$f_5(\theta_a^{QoS}, m) = \begin{cases} 0 & \text{if } m \notin M_a \text{ OR } \theta_a^{QoS} < \tilde{\theta} \\ \Lambda & \text{otherwise} \end{cases} \quad (9)$$

where
- $M_a$ is the set of PRBs belonging to the first channel a and does not include the shared PRBs in β", i.e., $M_a$ represents the spectrum region where the first operator A exercises its paternity at a certain time instant;
- $\Lambda$ is a large positive number; and
- $\tilde{\theta}$ is a threshold value corresponding to a total number of pending requests such as to occupy a pre-set fraction of the total resources available on the first channel a; $\tilde{\theta}$ can be conveniently computed by inverting an Erlang C distribution given the service requirements intended to be satisfied for the services with guaranteed QoS.

An improvement over the step function (9) can conveniently be a function with a smoother slope such to prevent possible system oscillation which can likely be observed if the step function (9) is used and if $\theta_a^{QoS}$ repeatedly crosses in both directions the threshold value $\tilde{\theta}$.

The positive effect of the term (9) or a smoothed variant thereof is that, if the operators A and B experience at the same time a peak of guaranteed-QoS traffic, then their transmission will concentrate on the respective paternity areas, temporarily excluding spectrum sharing. The benefit foreseen for this system is close to a distributed scheduling, while requirements on inter-operator signalling bandwidth and latency are much relaxed compared to distributed scheduling.

One variant of the scheduling score (8) could conveniently distinguish between the exclusive access zones of the first channel a and the shared zones. Although in general the best performance is expected when the maximum freedom is left to the scheduler, in early implementations allocating different services to different spectrum zones could help limiting hardware complexity.

Once that scheduling decisions have been taken on the basis of the computed scheduling score (8) as previously described, all users served by the first operator A can be served at the physical layer without considering that some resources can be shared with the second operator B. A typical example is a single-cell Multi-User Multi-Input-Multi-Output (MU-MIMO) with precoding, which is well-known from the literature (e.g. Regularized Block Diagonalization (RBD) precoding or Signal-to-Leakage-and-Noise Ratio (SLNR) precoding).

Furthermore, according to the preferred embodiment of the present invention a traffic shaping via prioritized scheduling for asymmetric backhauling capacity can be achieved.

In particular, if the two operators A and B have different radio access network backhauling capacities, and if the bottleneck is not represented by the air interface, but by the backhaul, then the overall performance can be improved by taking into account the difference in backhauling capacity. In the asymmetric backhauling capacity scenario an affected mechanism could be inter-operator handover, but this is not considered in detail in the present invention. On the contrary, let us consider the possibility to take into account the difference in backhauling capacity in the scheduling process.

In detail, the definition (9) of $f_5$ can be conveniently changed as follows:

$$f_5(\theta_a^{QoS}, m) = \begin{cases} 0 & \text{if } m \notin M_a' \text{ OR } \theta_a^{QoS} < \tilde{\theta} \\ \Lambda & \text{otherwise} \end{cases} \quad (9')$$

where $M_a'$ is not exactly the set of PRBs where the first operator A exercises his paternity. Instead, if the first operator A has a larger backhauling capacity than the second operator B, $M_a'$ represents a (slightly) larger set of resources than the first channel a. The actual detailed description of $M_a'$ should be decided and put in common by the operators A and B. The second operator B will instead use a PRB set $M_b'$ smaller than the second channel b.

Of course, the opposite will happen in case the first operator A has a smaller backhauling capacity than the second operator B.

The advantages of the present invention are clear from the foregoing.

Finally, it is clear that numerous modifications and variants can be made to the present invention, all falling within the scope of the invention, as defined in the appended claims.

In particular, in presence of an interface for inter-operator signalling having a wide bandwidth and low latency, system design may change considerably in comparison with the previously described preferred embodiment of the present invention.

In detail, the following differences can be foreseen:
- measurements and signalling used in the intra-operator and inter-operator ICIC process can happen on a shorter time scale, with less averaging in time;
- scheduling decisions can be taken in a distributed fashion, as opposed to per-cell (or per-site) scheduling decisions in the previously described preferred embodiment of the present invention; and
- physical access to multiple users can happen not only as a single-site MU-MIMO, but as a multi-site MU-MIMO.

Furthermore, in the previously described preferred embodiment of the present invention inter-operator hand-over is foreseen, and in theory such a mechanism could bring benefits in terms of spectral efficiency and coverage. However, inter-operator hand-over is also likely to prove a source of increased system complexity, and might even be difficult to implement when the inter-operator signalling interface has a very limited bandwidth.

As a simplified alternative to the preferred embodiment, a system where no inter-operator hand-over is present can be considered.

In particular, in this case, the spectrum sharing mechanism is similar to the one proposed in the preferred embodiment, with the difference that users from at least one operator are served on the shared band but only by the base stations of the operator they are affiliated to. Moreover, on exclusive access bands, each user can be served only on the spectrum originally belonging to the operator he/she is affiliated to, and can never be served on the exclusive spectrum of the other operator.

The invention claimed is:

1. A method for sharing radio resources between two or more radio communication systems each controlled by a respective operator and configured to control respective proprietary radio resources and to provide respective served user devices with radio communication services, the method comprising:
   determining, by at least one radio communication system, a bandwidth of respective shared radio resources within the proprietary radio resources of the at least one radio communication system on the basis of an estimated traffic load related to guaranteed-quality of radio communication services;
   signalling, by said at least one radio communication system, the respective shared radio resources determined by the at least one radio communication system to the other radio communication system(s);
   receiving, at said at least one radio communication system, shared radio resources signalled by the other radio communication system(s);
   providing, by said at least one radio communication system, the respective served user devices with the radio communication services on the respective proprietary radio resources; and
   providing, by said at least one radio communication system, served user devices affiliated with an operator different from the respective operator of the at least one radio communication system with radio communication services on the shared radio resources, which are shared by said at least one radio communication system.

2. The method of claim 1, wherein determining, by said at least one radio communication system, a bandwidth of respective shared radio resources comprises:
   estimating an average traffic load for the guaranteed-quality of radio communication services; and
   determining the bandwidth of the respective shared radio resources on the basis of the estimated average traffic load.

3. The method of claim 2, wherein the bandwidth of the respective shared radio resources is determined on the basis of a non-increasing or monotonically decreasing function of the estimated average traffic load.

4. The method of claim 1, further comprising:
   exchanging between the radio communication systems inter-operator coordination messages concerning inter-operator interference on interfered radio resources.

5. The method of claim 4, further comprising:
   determining, by the at least one radio communication system, inter-operator-interference-related quantities indicative of inter-operator interference on the respective proprietary radio resources and on the radio resources shared by the other radio communication system(s);
   and wherein the inter-operator coordination messages are exchanged based on the determined inter-operator-interference-related quantities.

6. The method of claim 5, wherein determining, by the at least one radio communication system, inter-operator-interference-related quantities comprises:
   determining a downlink-inter-operator-interference-related quantity indicative of a downlink inter-operator interference experienced in downlink communications by a respective served user device from an interfering radio communication system on a first interfered radio resource belonging to the respective proprietary radio resources or to the radio resources shared by the other radio communication system(s); and
   determining an uplink-inter-operator-interference-related quantity indicative of an uplink inter-operator interference experienced in uplink communications by the radio communication system from an interfering radio communication system on a second interfered radio resource belonging to the respective proprietary radio resources or to the radio resources shared by the other radio communication system(s).

7. The method according to claim 4, wherein exchanging comprises:
   transmitting from an interfering radio communication system to an interfered radio communication system an inter-operator coordination message concerning inter-operator interference caused by the interfering radio communication system on an interfered radio resource belonging to the proprietary radio resources controlled by the interfering radio communication system or to the radio resources shared by the other radio communication system(s) with the interfering radio communication system.

8. The method according to claim 4, wherein exchanging comprises:
   transmitting from an interfered radio communication system to an interfering radio communication system an inter-operator coordination message concerning inter-operator interference caused by the interfering radio communication system on an interfered radio resource belonging to the proprietary radio resources controlled by the interfered radio communication system or to the radio resources shared by the other radio communication system(s) with the interfered radio communication system.

9. The method of claim 4, further comprising:
   computing, by the at least one radio communication system, scores of potential allocations to the respective served user devices of the respective proprietary radio resources and of the radio resources shared by the other radio communication system(s) on the basis of the exchanged inter-operator coordination messages concerning inter-operator interference on the respective proprietary radio resources and on the radio resources shared by the other radio communication system(s); and
   scheduling, by the at least one radio communication system, a radio resource allocation of the respective proprietary radio resources and of the radio resources shared by the other radio communication system(s) to the respective served user devices on the basis of the computed scores.

10. The method of claim 9, wherein computing, by the at least one radio communication system, scores of potential allocations comprises:
    computing a score of a considered potential allocation to a considered respective served user device of a considered radio resource belonging to the respective proprietary radio resources or to the radio resources shared by the other radio communication system(s) on the basis of
       the exchanged inter-operator coordination messages concerning inter-operator interference on the considered radio resource, and
       a given function of the considered radio resource and of a guaranteed-quality-traffic load related to guaranteed-quality of radio communication services.

11. The method of claim 10, wherein the given function assumes a higher value if the considered radio resource belongs to the respective proprietary radio resources and the guaranteed-quality-traffic load is higher than, or equal to, a given threshold, while the given function assumes a lower value if the considered radio resource belongs to the radio resources shared by the other radio communication system(s) or the guaranteed-quality-traffic load is lower than the given threshold;

and wherein the score of the considered potential allocation is directly proportional to the value assumed by said given function.

12. The method according to claim 10, further comprising exchanging within the at least one radio communication system intra-operator coordination messages concerning intra-operator interference on interfered radio resources;

and wherein the score of the considered potential allocation is computed also on the basis of:

a quantity indicative of a transmission capacity associated with said considered potential allocation;

the exchanged intra-operator coordination messages concerning intra-operator interference on said considered radio resource; and a power transmitted on said considered radio resource.

13. The method according to claim 9, further comprising:

generating, by the at least one radio communication system, several candidate aggregate allocations each comprising corresponding considered potential allocations to considered respective served user devices of considered radio resources belonging to the respective proprietary radio resources and to the radio resources shared by the other radio communication system(s);

wherein computing, by the at least one radio communication system, scores of potential allocations comprises:

computing the score of each considered potential allocation in said candidate aggregate allocations; and computing a total score of each candidate aggregate allocation on the basis of the scores of the corresponding considered potential allocations;

and wherein scheduling, by the at least one radio communication system, a radio resource allocation comprises:

scheduling the candidate aggregate allocation having the highest total score.

14. A radio communication system, controllable by a given operator, comprising:

circuitry configured to control given proprietary radio resources;

provide served user devices with radio communication services on the given proprietary radio resources and on radio resources shared by one or more other radio communication system(s) each controlled by a respective operator different from the given operator and configured to control respective proprietary radio resources different from the given proprietary radio resources;

determine a bandwidth of respective shared radio resources within the proprietary radio resources of the radio communication system on the basis of an estimated traffic load related to guaranteed-quality of radio communication services;

signal the respective shared radio resources determined by the radio communication system to the other radio communication system(s);

receive shared radio resources signalled by the other radio communication system(s);

provide the respective served user devices with the radio communication services on the respective proprietary radio resources; and provide, by the radio communication system, served user devices affiliated with the respective operator different from the given operator of the at least one radio communication system with radio communication services on the shared radio resources, which are shared by the radio communication system.

15. The radio communication system of claim 14, wherein the circuitry is further configured to exchange between the radio communication systems inter-operator coordination messages concerning inter-operator interference on interfered radio resources.

16. The radio communication system of claim 15, wherein the circuitry is further configured to compute scores of potential allocations to the respective served user devices of the respective proprietary radio resources and of the radio resources shared by the other radio communication system(s) on the basis of the exchanged inter-operator coordination messages concerning inter-operator interference on the respective proprietary radio resources and on the radio resources shared by the other radio communication system(s); and schedule a radio resource allocation of the respective proprietary radio resources and of the radio resources shared by the other radio communication system(s) to the respective served user devices on the basis of the computed scores.

17. A non-transitory computer program product comprising software code portions which are loadable in a memory of a network apparatus of a radio communication system controlled by a given operator and configured to control given proprietary radio resources and to provide served user devices with radio communication services on the given proprietary radio resources and on radio resources shared by one or more other radio communication system(s) each controlled by a respective operator different from the given operator and configured to control respective proprietary radio resources different from the given proprietary radio resources, wherein the software code portions, when executed by the network apparatus of the radio communication system, cause the network apparatus to carry out a method comprising:

determining a bandwidth of respective shared radio resources within the proprietary radio resources of the radio communication system on the basis of an estimated traffic load related to guaranteed-quality of radio communication services;

signalling the respective shared radio resources determined by the network apparatus to the other radio communication system(s);

receiving shared radio resources signalled by the other radio communication system(s);

providing the respective served user devices with the radio communication services on the respective proprietary radio resources; and providing, by the communication system, served user devices affiliated with the respective operator different from the given operator of the at least one radio communication system with radio communication services on the shared radio resources, which are shared by the radio communication system.

18. The non-transitory computer program product of claim 17, wherein the method carried out by the network apparatus further comprises:

exchanging between the radio communication systems inter-operator coordination messages concerning inter-operator interference on interfered radio resources.

19. The non-transitory computer non-transitory computer program product of claim 17, wherein the method carried out by the network apparatus further comprises:

computing scores of potential allocations to the respective served user devices of the respective proprietary radio resources and of the radio resources shared by the other radio communication system(s) on the basis of the exchanged inter-operator coordination messages concerning inter-operator interference on the respective proprietary radio resources and on the radio resources shared by the other radio communication system(s); and scheduling a radio resource allocation of the respective proprietary radio resources and of the radio resources shared by the other radio communication system(s) to the respective served user devices on the basis of the computed scores.

20. An inter-operator radio resource sharing method for sharing radio resources between two or more radio communication systems each controlled by a respective operator and configured to control respective proprietary radio resources and to provide respective served user devices with radio communication services, the inter-operator radio resource sharing method comprising:

determining, by at least one radio communication system, a bandwidth of respective shared radio resources within the proprietary radio resources of the at least one radio communication system on the basis of an estimated traffic load related to guaranteed-quality of radio communication services;

signalling, by said at least one radio communication system, the respective shared radio resources determined by the at least one radio communication system to the other radio communication system(s);

providing, by at least one of said other radio communication system(s), the respective served user devices with the radio communication services on the respective proprietary radio resources; and providing, by the at least one of said other radio communication system(s), served user devices affiliated with an operator different from the respective operator(s) of the at least one said other radio communication system(s) with radio communication services on the shared radio resources, which are shared by the at least one of said other radio communication system(s).

* * * * *